United States Patent
Haga et al.

(10) Patent No.: US 6,587,360 B2
(45) Date of Patent: Jul. 1, 2003

(54) POLYPHASE RECTIFYING APPARATUS HAVING SINGLE-PHASE RECTIFIERS CONTROLLED BY COMMON CONTROL SIGNAL

(75) Inventors: Hiroyuki Haga, Hanno (JP); Yoshihiko Kikuchi, Hanno (JP)

(73) Assignee: Shindengen Electric Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/020,165

(22) Filed: Dec. 18, 2001

(65) Prior Publication Data

US 2002/0080632 A1 Jun. 27, 2002

(30) Foreign Application Priority Data

Dec. 25, 2000 (JP) .......................... 2000-391986
Sep. 25, 2001 (JP) .......................... 2001-291149

(51) Int. Cl.[7] .............................................. H02M 1/12
(52) U.S. Cl. .......................................... 363/65; 363/44
(58) Field of Search ....................... 363/39, 40, 44–48, 363/50, 52, 53, 55, 56.01, 65, 67, 69–71, 34, 36, 37

(56) References Cited

U.S. PATENT DOCUMENTS

| | | | |
|---|---|---|---|
| 5,003,453 A | | 3/1991 | Tighe et al. |
| 5,321,600 A | | 6/1994 | Fierheller |
| 5,694,307 A | * | 12/1997 | Murugan ..................... 363/37 |
| 5,731,969 A | | 3/1998 | Small |
| 5,757,637 A | | 5/1998 | Tuck et al. |
| 5,942,818 A | * | 8/1999 | Satoh et al. ................... 310/46 |
| 5,982,645 A | | 11/1999 | Levran et al. |
| 6,031,739 A | * | 2/2000 | He et al. ....................... 363/44 |

FOREIGN PATENT DOCUMENTS

| | | |
|---|---|---|
| EP | 0 595 091 A2 | 5/1994 |
| JP | 6-217551 | 8/1994 |
| JP | 10-271823 | 10/1998 |
| WO | WO 99/57800 | 11/1999 |

OTHER PUBLICATIONS

"A High Density 48V 200A Rectifier with Power Factor Correction—An Engineering Overview", Chapman et al, *S. & C. Rectifiers, Battery Chargers*, Sep. 27, 1993. pp. 118–125.

"A Simple Control Strategy Applied to Three–Phase Rectifier Units for Telecommunication Applications Using Single–Phase Rectifier Modules", Heldwein et al, *IEEE*, Apr. 1999, pp. 795–800.

"Modular Development of Single–Stage 3–Phase PFC Using Single–Phase Step–Down Converters", HUI et al, *IEEE*, Aug. 1998, pp. 776–782.

* cited by examiner

*Primary Examiner*—Matthew Nguyen
(74) *Attorney, Agent, or Firm*—Arent Fox Kintner Plotkin & Kahn, PLLC (57) ABSTRACT

A polyphase rectifying apparatus is disclosed, which substantially solves the instability of the single-phase rectifiers without adding a special circuit element, thereby balancing the input voltages of the single-phase rectifiers. The polyphase rectifying apparatus, used in a two or more-phase system, comprises a single-phase rectifier assigned to each phase, and having first and second input terminals, wherein the single-phase rectifiers of each phase are star-connected and the first input terminal of each single-phase rectifier is connected to the corresponding phase and the second input terminals of each of the single-phase rectifiers are connected to each other; and a converter assigned to each phase, wherein the output from the single-phase rectifier of the relevant phase is input into the corresponding converter. The single-phase rectifiers for all the phases are controlled by a common control signal. Preferably, the converters of all the phases are also controlled by a common control signal.

14 Claims, 7 Drawing Sheets

POLYPHASE RECTIFYING APPARATUS HAVING SINGLE-PHASE RECTIFIERS CONTROLLED BY COMMON CONTROL SIGNAL

BACKGROUND OF THE INVENTION

1. Field of the Invention

The present invention relates to balancing of the input voltage in a polyphase rectifying apparatus having a circuit structure in which single-phase rectifiers are star-connected.

2. Description of the Related Art

Figure 6:
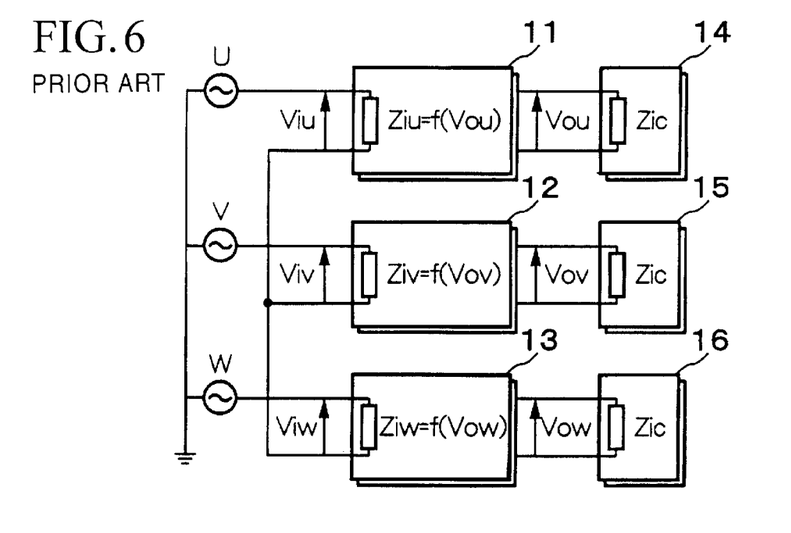
FIG. 6 is a block diagram showing a generalized structure of a conventional single-phase rectifiers which function as a stabilized power supply.
Figure 7:
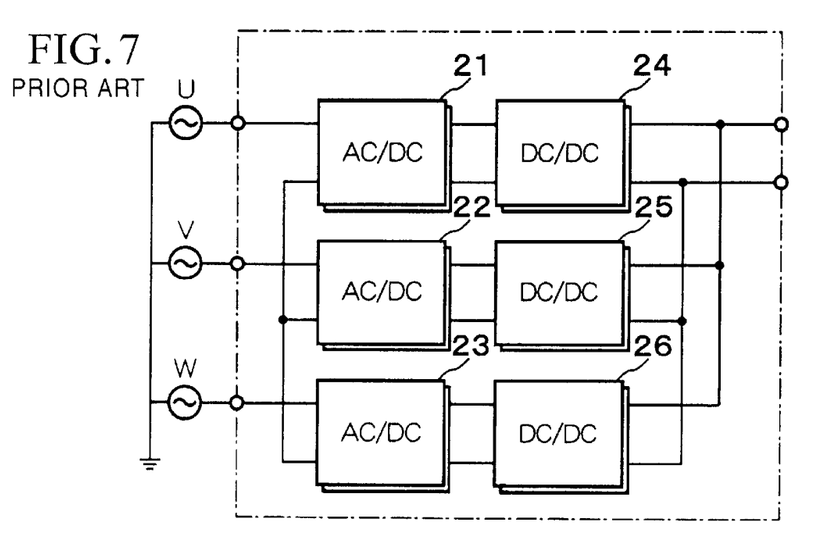
FIG. 7 is a block diagrams showing the structure of a conventional polyphase rectifying apparatus.

FIGS. 6 and 7 are block diagrams showing and explaining the structure of a conventional three-phase three-wire rectifying apparatus. In FIG. 7, reference numerals 21, 22, and 23 indicate single-phase rectifiers, and reference numerals 24, 25, and 26 indicate converters. According to such star-connected single-phase rectifiers, the input voltage of each single-phase rectifier is given by "line voltage/$\sqrt{3}$". Therefore, if the input source is AC 400V, the input voltage of each single-phase rectifier is approximately 230V, and accordingly, a 200V system can be used in the design of the single-phase rectifiers.

However, for such simple star-connected single-phase rectifiers, the input voltage is not balanced and the merit of reducing the input voltage to a $1/\sqrt{\phantom{-}}$' level is not efficiently obtained. The reason for this will be explained below.

Figure 8:
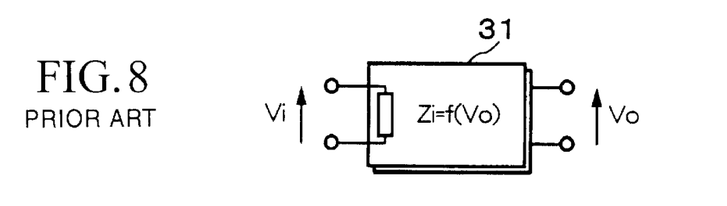
FIG. 8 is a diagram for explaining the operation of a stabilized power supply.

FIG. 8 is a diagram showing the general structure of a stabilized power supply which outputs a stabilized (i.e., fixed) output voltage. That is, the stabilized power supply is a "black box" for changing the impedance Zi (observed from the input) according to the output voltage Vo and internally converting and outputting the internal energy which depends on the impedance.

That is, when the output voltage decreases to below a specific level, the stabilized power supply decreases the impedance Zi observed from the input so as to transmit a larger amount of energy, thereby increasing the output voltage Vo. Conversely, when the output voltage increases above a specific level, the stabilized power supply increases the impedance Zi so as to decrease the transmitted energy, thereby decreasing the output voltage Vo.

FIG. 6 shows a generalized structure of the single-phase rectifiers which function as a stabilized power supply. That is, the single-phase rectifier is also regarded as a black box for changing the impedance Zin (observed from the input) according to its own output voltage. For convenience of explanation, it is assumed that the impedance Zic of the converter observed from the input is not changed. This is an ideal condition. In addition, each single-phase rectifier has the same characteristics, that is, it is assumed that the three functions "Ziu=f(Vou)", "Ziv=f(Vov)", and "Ziw=f(Vow)", are the same. This is also an ideal condition.

Under these ideal conditions, if the output voltages Vou, Vov, and Vow of the single-phase rectifiers are the same, the impedances Ziu, Ziv, and Ziw observed from the input are the same. It is obvious that when the impedances Ziu, Ziv, and Ziw are all the same, the input voltages Viu, Viv, and Viw are also the same.

When such an ideal balanced state is slightly unbalanced, for example, when the output voltage Vou of the single-phase rectifier 11 slightly decreases, the impedance Ziu observed from the input is slightly decreased so as to stabilize the output voltage, as explained above. Accordingly, the input voltage Viu is also slightly decreased because the input voltages Viu, Viv, and Viw depend on the impedance ratio.

Here, the energy transmitted through the single-phase rectifier 11 is $(Viu)^2/Ziu$. Therefore, when the input voltage Viu decreases, the transmitted energy also decreases, and when the transmitted energy decreases, the output voltage Vou also decreases. Accordingly, the impedance Ziu decreases again, thereby decreasing Viu, Vou, . . . , that is, such a decreasing operation (i.e., positive feedback) is repeated and the input voltage Viu finally decreases to a lower limit.

Therefore, the circuit shown in FIG. 6 is essentially unstable, and if the output voltage is slightly changed due to a disturbance, this change is amplified. Therefore, even if the characteristics of the single-phase rectifiers and converters are equalized, it is impossible to actually maintain a balanced state of the input voltages.

As explained above, the problem of unbalanced input voltages is not solved only by simply providing single-phase rectifiers for each phase.

Figure 9:
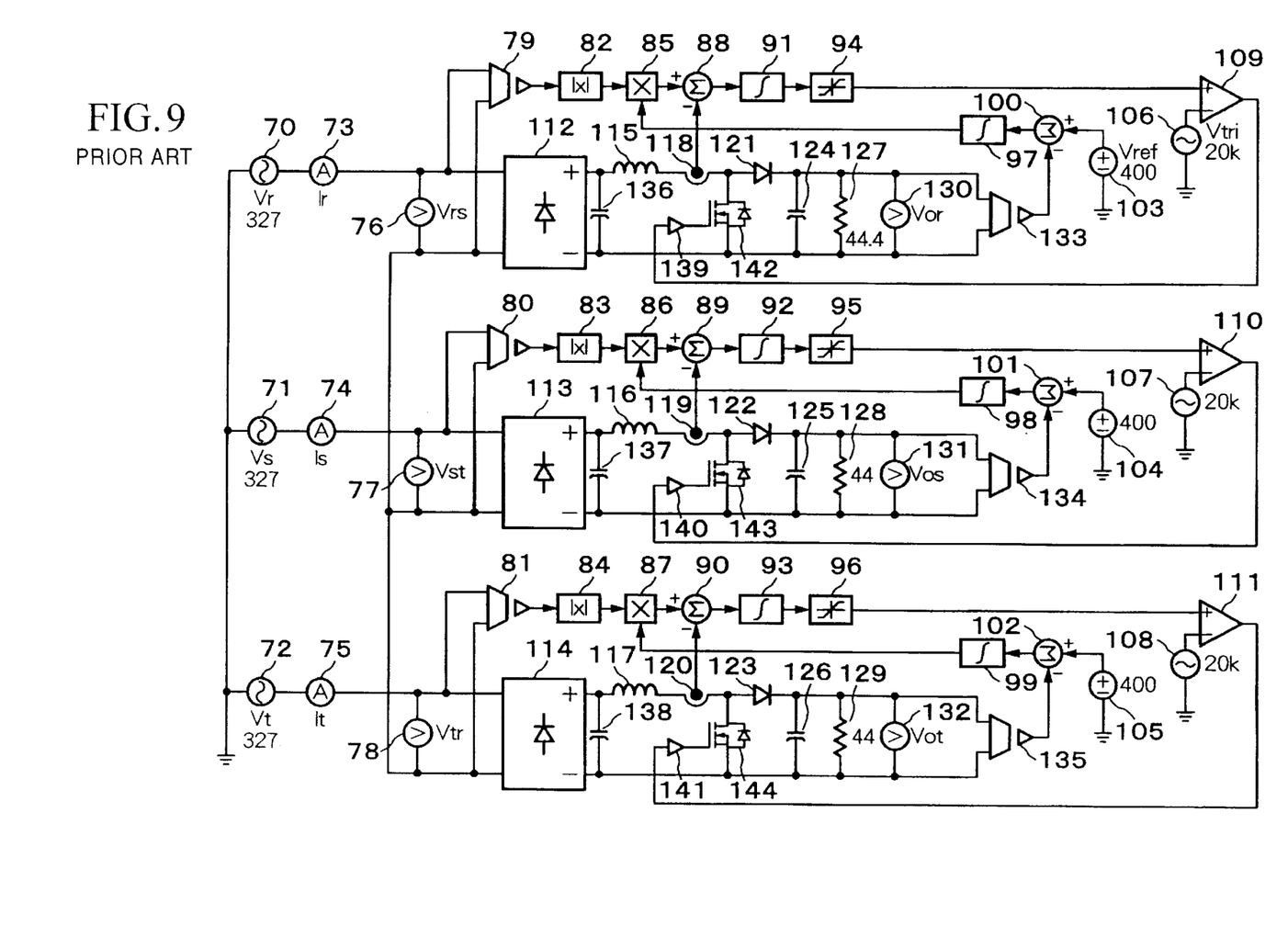
FIG. 9 is a circuit diagram of a conventional polyphase rectifying apparatus.

FIG. 9 shows a conventional circuit which employs a step-up chopper type active filter for each single-phase rectifier in FIG. 6, and FIGS. 10A to 10C are diagrams showing the simulated characteristics of the circuit. In FIG. 9, resistors 127, 128, and 129 have been substituted for the converters on the assumption that the impedance observed from the input is the same for each phase.

When the resistors 127, 128, and 129 have the same resistance, the input voltages of the single-phase rectifiers are balanced as explained above. Here, it is assumed that the resistance of the resistor 127 is higher by 1% than the resistances of the other resistors so as to provide an imbalance between the converters.

Figure 10A:
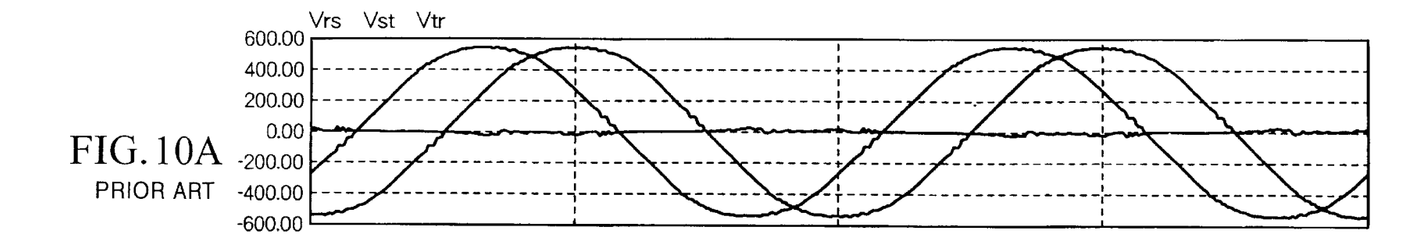
FIGS. 10A to 10C are diagrams showing the simulated characteristics of the circuit of FIG. 9.
Figure 10B:
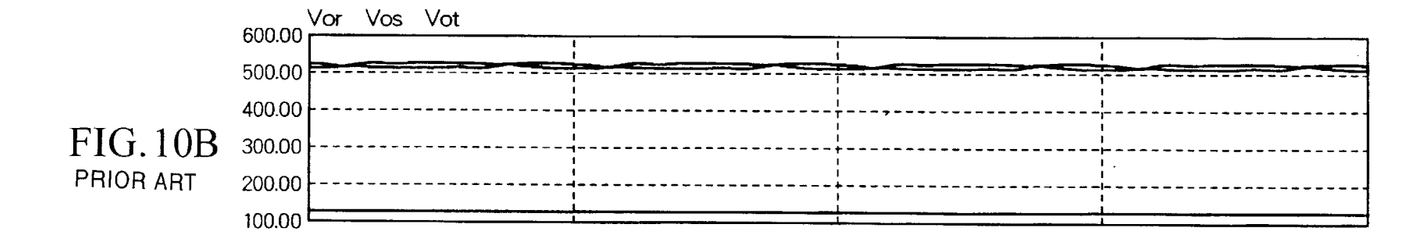
Figure 10C:
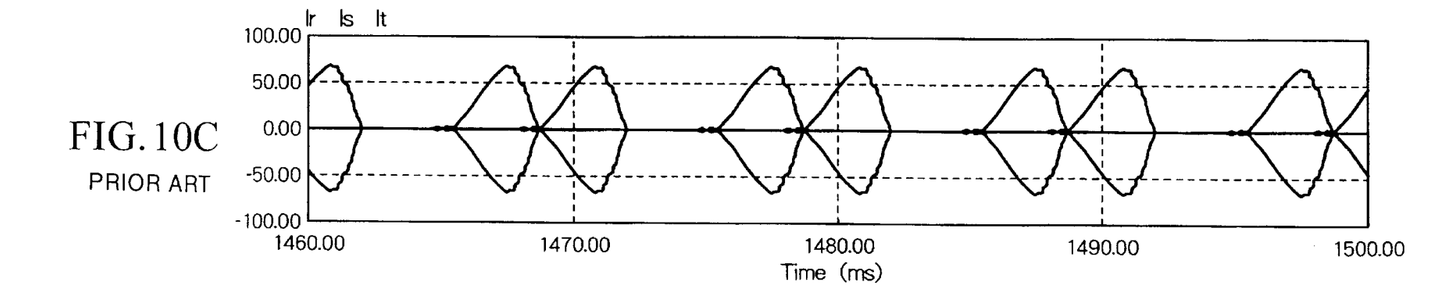

FIGS. 10A to 10C show the results of a simulation for the case that the resistor 127 has a resistance 1% higher than the other resistors. FIG. 10A shows the waveform of the input voltage of each single-phase rectifier, that is, the waveforms which are measured by voltmeters 76, 77, and 78. As clearly shown in FIG. 10A, the input voltages of the single-phase rectifiers are unbalanced. The input voltage of the phase corresponding to the resistor 128 is almost 0, and accordingly, the input voltages of the other phases are higher than the specific (i.e., suitable) level.

FIG. 10B shows the waveform of the output voltage of each single-phase rectifier, that is, the waveforms which are measured by voltmeters 130, 131, and 132. The output voltage of the phase corresponding to the resistor 128 is lower, while the output voltages of the other two phases are higher. Here, the specific output voltage is 400V, and the output voltages of the other two phases are considerably higher than 400V.

FIG. 10C shows the waveform of the line current of each phase, that is, the waveforms which are measured by ammeters 73, 74, and 75. The waveforms indicate that a function as an active filter is not active but a function close to condenser input is active.

Japanese Unexamined Patent Application, First Publication No. Hei 6-217551 discloses a technique for solving imbalances in the input voltage, in which a controller 30 (see FIG. 5 of the publication) is provided. The input voltage of each phase is balanced by controlling the load of each single-phase rectifier by using the controller 30.

In addition, PCT International Publication No. WO94/27357 discloses another conventional technique for solving imbalances in the input voltage, in which a virtual neutral point N is generated using resistive elements, and a control circuit for making the voltage between the connection point of the single-phase rectifiers and the virtual neutral point zero is provided. That is, the electric potentials of the connection point of the single-phase rectifiers and the virtual neutral point are the same, and which results in a balanced state.

PCT International Publication No. WO99/57800 also discloses another conventional technique for solving imbalances in the input voltage, in which means A2 (see FIG. 3 of the publication) for generating an artificial neutral point is provided, and the connection point NA2 between the single-phase rectifiers is the artificial neutral point. Such means for generating an artificial neutral point is limited to a magnetic component which makes the sum of the vectors of the magnetic fluxes inside the system zero.

SUMMARY OF THE INVENTION

In consideration of the above circumstances, an object of the present invention is to provide a polyphase rectifying apparatus which substantially solves the instability of the single-phase rectifiers without adding a special circuit element (as added in the conventional systems), thereby balancing the input voltages of the single-phase rectifiers.

Therefore, the present invention provides a polyphase rectifying apparatus used in a two or more-phase system, comprising:

a single-phase rectifier assigned to each phase, and having first and second input terminals, wherein the first input terminal of each single-phase rectifier is connected to the corresponding phase and the second input terminals of each of the single-phase rectifiers are connected to each other; and a converter assigned to each phase, wherein the output from the single-phase rectifier of the relevant phase is input into the corresponding converter, wherein:

the single-phase rectifiers for all the phases are controlled by a common control signal.

In the above structure, the second input terminal of each single-phase rectifier may be connected to a neutral point.

Typically, each single-phase rectifier functions as a step-up chopper type active filter.

Preferably, the converters of all the phases are controlled by a common control signal.

Typically, the common control signal is the output voltage from one of the single-phase rectifiers. The common control signal may be the maximum or minimum voltage among the output voltages from the single-phase rectifiers. In addition, the common control signal may be the average of the output voltages from the single-phase rectifiers.

Typically, the impedances of the single-phase rectifiers observed from the input are controlled by the common control signal.

When the converters are also controlled by a common control signal, typically, the impedances of the converters observed from the input are controlled by the common control signal.

According to the present invention, the impedances of the star-connected single-phase rectifiers observed from the input can be balanced. Therefore, if no neutral point is provided, the input voltages of the single-phase rectifiers are balanced, while if a neutral point is provided, the neutral-line currents can be reduced.

In the balanced state of the input voltages of the single-phase rectifiers, the input voltage of each single-phase rectifier is given by "line voltage/$\sqrt{3}$". Therefore, if the input source is AC 400V, the input voltage of each single-phase rectifier is approximately 230V, and accordingly, a 200V system can be used in the design of the single-phase rectifiers.

DESCRIPTION OF THE PREFERRED EMBODIMENTS

Hereinafter, embodiments according to the present invention will be explained in detail with reference to the drawings.

Figure 1:
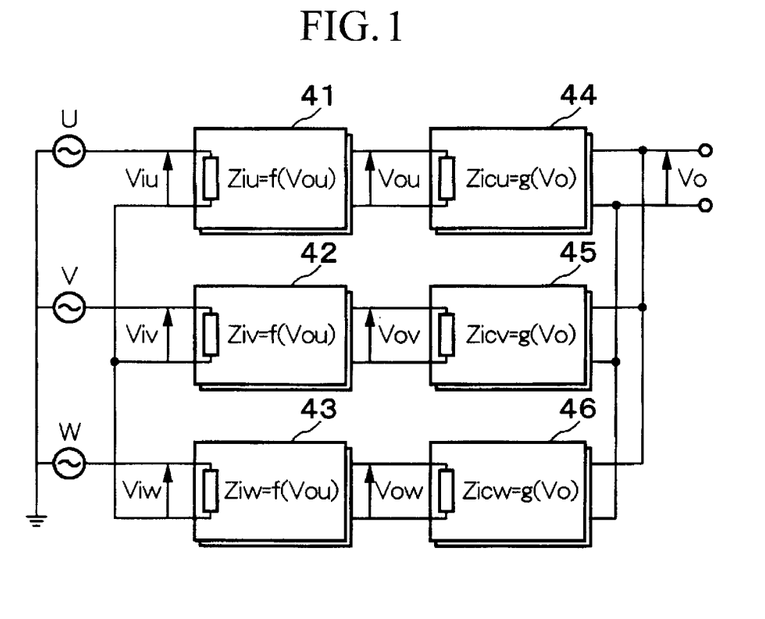
FIG. 1 is a block diagrams showing the structure of the polyphase rectifying apparatus as an embodiment of the present invention, in which the output voltage Vou from one of the single-phase rectifiers is used as a common control signal.
Figure 2:
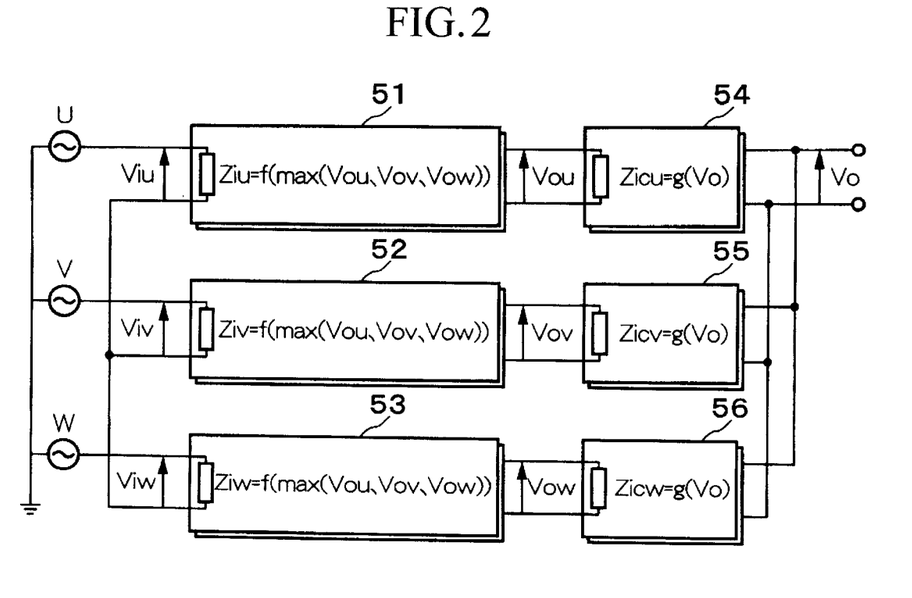
FIG. 2 is a block diagrams showing the structure of the polyphase rectifying apparatus as an embodiment of the present invention, in which the maximum value among the output voltages Vou, Vov, and Vow from the single-phase rectifiers is used as a common control signal.
Figure 3:
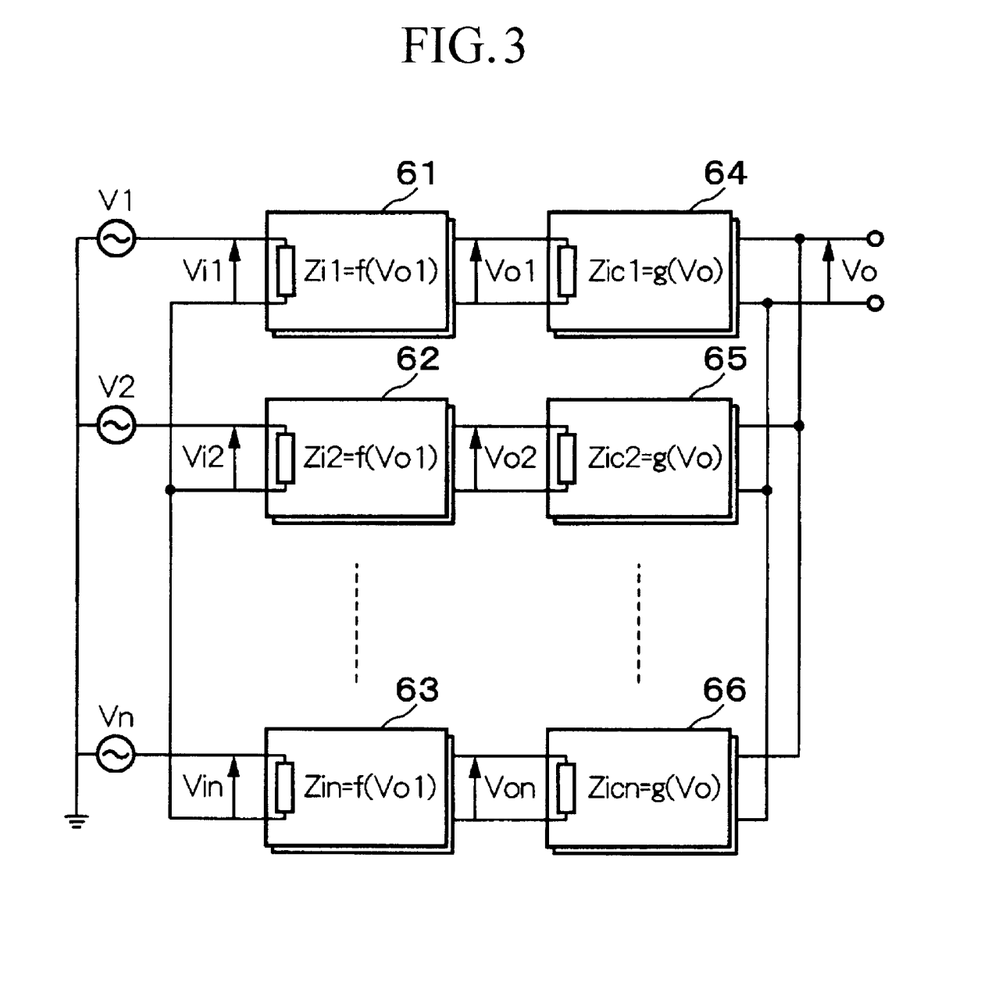
FIG. 3 is a block diagrams showing the structure of the polyphase rectifying apparatus as an embodiment of the present invention, in which the present invention is applied to a polyphase rectifying apparatus having any number of phases.

FIGS. 1 to 3 are block diagrams showing and explaining the polyphase rectifying apparatus as an embodiment of the present invention. In FIG. 1, reference numerals 41, 42, and 43 indicate single-phase rectifiers which respectively control impedances Ziu, Ziv, and Ziw observed from the input, not based on their own output voltages, but based on the output voltage Vou of one of the single-phase rectifiers as a common control signal. Reference numerals 44, 45, and 46 indicate converters, which function as stabilized power supplies and are also controlled by a common control signal Vo.

According to the above structure, the impedances observed from the input are always equal to each other, so that the input voltages Viu, Viv, and Viw, which depend on the impedance ratio, are always equal to each other. Therefore, the balanced state is maintained.

The above-explained problem relating to the imbalances is solved by the above structure. However, the output voltages of the single-phase rectifiers other than Vou are not controlled; thus, the corresponding voltages may be unstable. This problem will be explained below.

In the present structure, it is assumed that the converters have the same characteristics, that is, the functions "Zicu= g(Vo)", "Zicv=g(Vo)", and "Zicw=g(Vo)" are the same. Accordingly, the impedances Zicu, Zicv, and Zicw of the converters observed from the input are all the same. Here, the impedances Ziu, Ziv, and Ziw of the single-phase rectifiers observed from the input are all the same; thus, the input voltages Viu, Viv, and Viw are also the same. The energy transmitted through the single-phase rectifier is (Vi)$^2$/Zi; thus, the energy transmitted through each single-phase rectifier is also the same. Therefore, the same energy passes through each of the converters which have the same impedances Zicu, Zicv, and Zicw; thus, the input voltages of the converters, that is, the output voltages Vou, Vov, and Vow of the single-phase rectifiers are also the same.

Here, it is assumed that there is a slight imbalance between the output voltages Vou, Vov, and Vow. For example, when the output voltage Vov of one of the uncontrolled phases slightly decreases, the energy (Vov)$^2$/Zciv transmitted through the converter of this phase (i.e., converter 45) also slightly decreases and thus is slightly lower than the corresponding transmitted energies of the other phases. On the other hand, the energies transmitted through the single-phase rectifiers are always the same because the impedances Ziu, Ziv, and Ziw observed from the input are the same and the input voltages Viu, Viv, and Viw are also the same. Therefore, a portion of energy cannot pass through the converter 45, and this energy portion remains in the converter 45, thereby increasing the input voltage. The input voltage of the converter corresponds to the output voltage Vov of the corresponding single-phase rectifier. Accordingly, in the present circuit, when the output voltage Vov decreases, the output voltage Vov is then increased by the same amount as this decrease.

On the other hand, if the output voltage Vov slightly increases, the energy to be transmitted through the converter 45 increases; thus, the energy which is actually transmitted through the converter is insufficient, thereby decreasing the input voltage. Therefore, the function of recovering the specific output voltage is active also in this case.

Therefore, according to the above-explained structure employing a commonly-controlled output voltage of the converter, the input voltage of each converter, that is, the output voltages Vou, Vov, and Vow of the single-phase rectifiers are the same. In addition, imbalances can be automatically corrected; thus, the present structure is substantially stable.

That is, even though the output voltage of only one single-phase rectifier is controlled, the above-explained problem relating to the non-controlled output voltages of the other single-phase rectifiers can be solved.

In the structure shown in FIG. 2, the single-phase rectifiers 51, 52, and 53 are controlled by a common control signal which is the maximum value among the output voltages Vou, Vov, and Vow of the single-phase rectifiers. However, if the minimum output voltage or the average output voltage functions as an important factor in other embodiments to which the present invention may be applied, the minimum output voltage or average output voltage may be effectively used as a common control signal.

FIG. 3 shows a structure in which the present invention is applied to an N-phase system (N=1, 2, . . . , n). As explained above, (i) once the voltage becomes unbalanced in a conventional structure in which each single-phase rectifier individually controls its own output voltage, the imbalance gets worse due to the positive feedback; (ii) when the single-phase rectifiers are controlled by a common control signal, the impedances observed from the input are always the same and thus the input voltages are balanced; and (iii) when the converters are controlled by a common control signal, the input voltages of the converters are also balanced. In consideration of these points, the present invention can be applied to a polyphase rectifying apparatus having any number (i.e., N=1, 2, . . . , n in the structure shown in FIG. 3) of phases.

The structures explained above have no neutral point. If a neutral point were provided, there would be none of the above problems relating to the voltage balance, because the input voltage is directly applied to the input of each of the single-phase rectifiers. However, if the impedances observed from the input of each single-phase rectifier were unbalanced, current would flow through the neutral line.

The impedances observed from the input of each single-phase rectifier are balanced according to the present invention; thus, the present invention is effective for reducing such neutral-line currents. Therefore, the present invention can also be applied to a structure having a neutral point to which an input terminal of each single-phase rectifier is connected.

Figure 4:
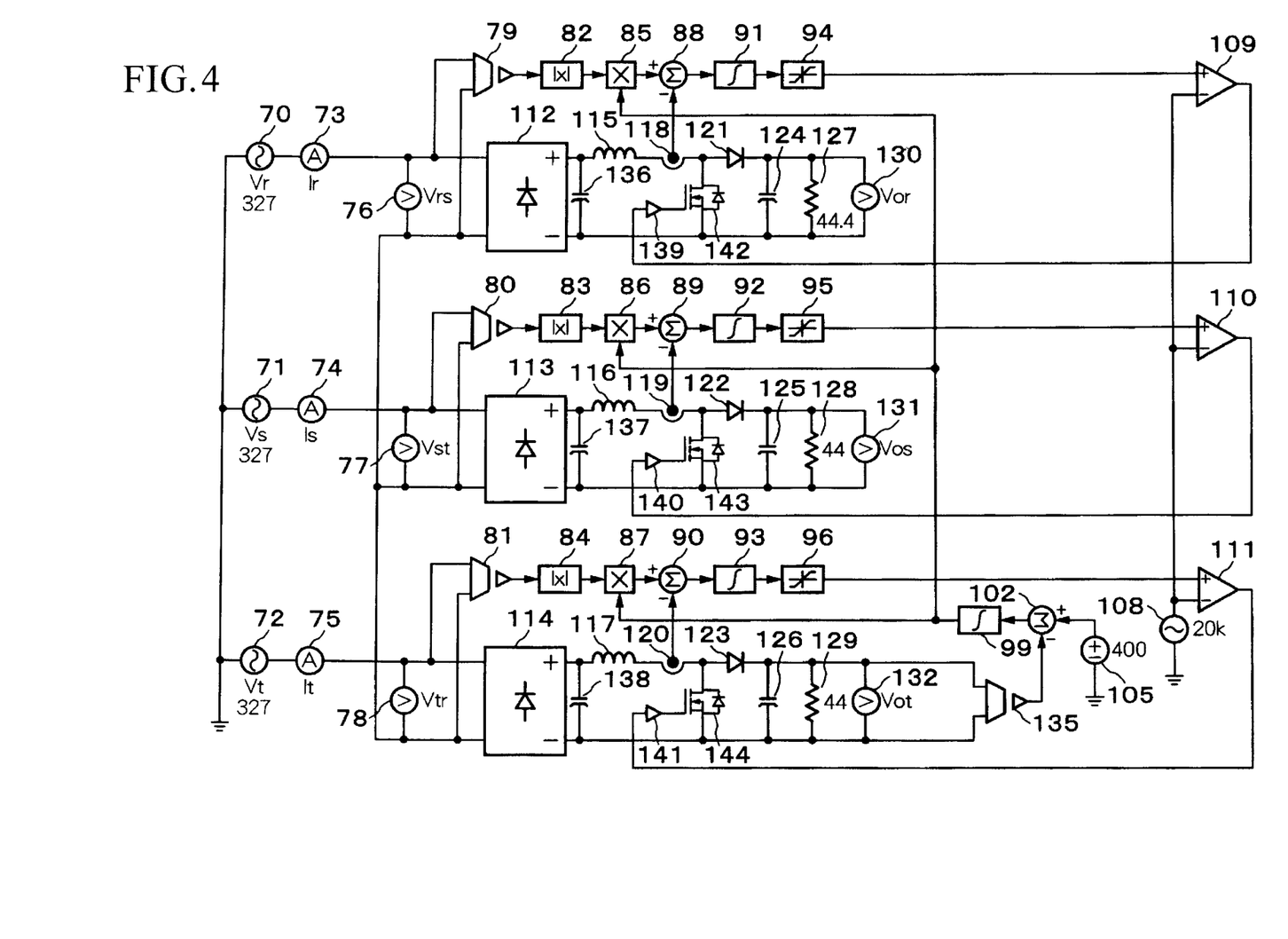
FIG. 4 is a circuit diagram showing a practical example related to the embodiment of the present invention.
Figure 5A:
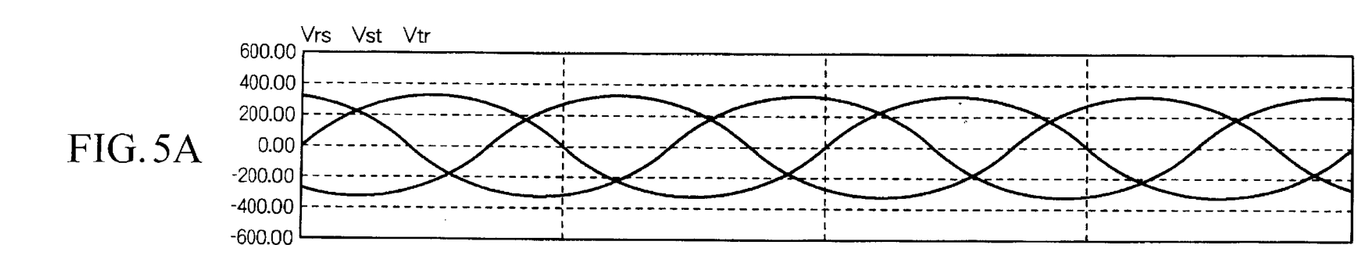
FIGS. 5A to 5C are diagrams showing the simulated characteristics of the circuit of FIG. 4.
Figure 5B:
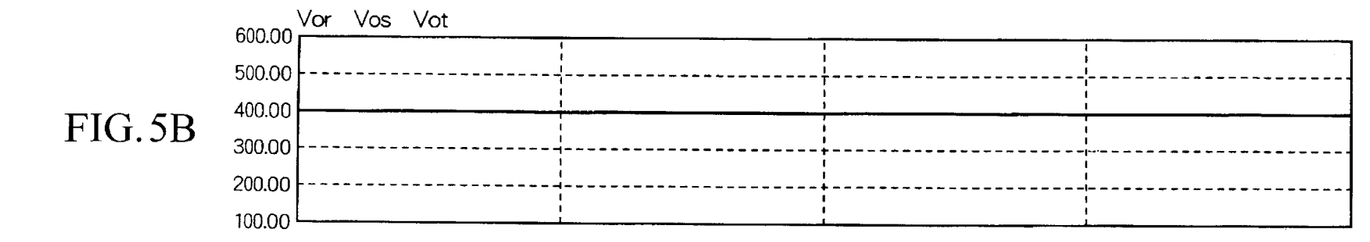
Figure 5C:
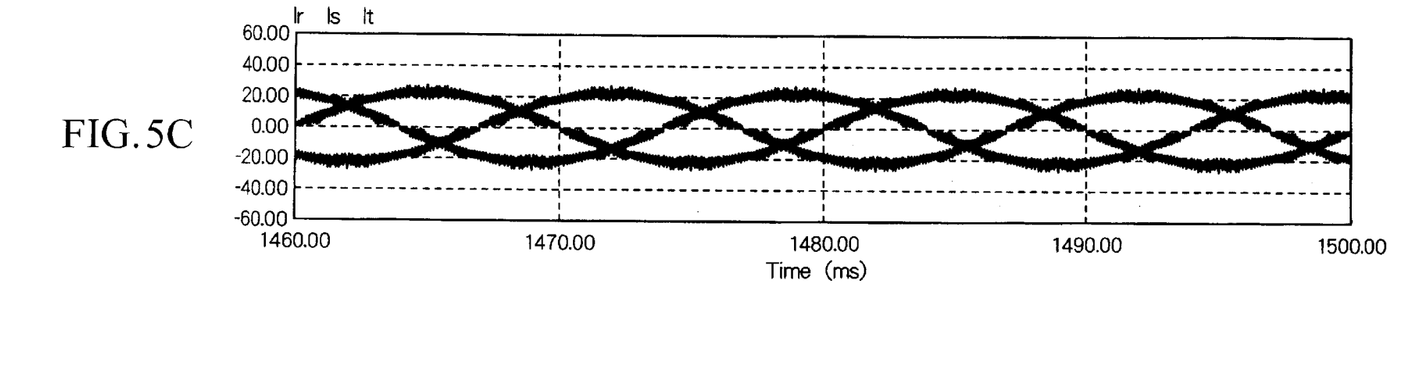

FIG. 4 is a circuit diagram showing a practical example of the present embodiment, and FIGS. 5A to 5C are diagrams showing the simulated characteristics of the circuit of FIG. 4.

As well known, control circuits employing step-up chopper type active filters amplify any errors between the reference voltage and the output voltage, multiply the amplified result by the waveform of the input voltage, and carry out the control so as to satisfy the condition that the result of the multiplication is equal to the waveform of the input voltage.

Such control of the input current is performed so as to make the waveform have a shape close to a sine curve and to improve the power factor; thus, the control does not relate to the impedance of each single-phase rectifier observed from the input. The impedance observed from the input is controlled by a section for controlling the output voltage; thus, a common control section for controlling the output voltage is provided for each phase.

FIGS. 5A to 5C show the results of a simulation for the case that the resistor 127 has a resistance 1% higher than the other resistors, as in the simulation performed for the conventional apparatus. FIG. 5A shows the waveform of the input voltage of each single-phase rectifier, that is, the waveforms which are measured by voltmeters 76, 77, and 78. As clearly shown in FIG. 5A, the input voltages of the single-phase rectifiers are balanced.

FIG. 5B shows the waveform of the output voltage of each single-phase rectifier, that is, the waveforms which are measured by voltmeters 130, 131, and 132. Here, the specific output voltage is 400V, and the output voltage of each phase is 400V as shown in FIG. 5B, which is normal.

FIG. 5C shows the waveform of the line current of each phase, that is, the waveforms which are measured by ammeters 73, 74, and 75. The waveforms indicate that the function as an active filter is functioning normally.

The distinctive features of the present invention in comparison with the prior art will be explained below.

In the present invention, the balanced state can be naturally attained without providing any specific device such as the controller disclosed in Japanese Unexamined Patent Application, First Publication No. Hei 6-217551, so that the circuit structure can be simplified. Also in the present invention, the circuit is substantially stable. Therefore, in comparison with a case in which a substantially-unstable circuit is controlled to stabilize it, the control is easier. Also in the present invention, the electric potential of the connection point of the single-phase rectifiers is naturally equal to the electric potential of a virtual neutral point, without controlling the electric potential of the connection point (as controlled in PCT International Publication No. WO94/27357). In the present invention, it is unnecessary to provide a complicated circuit for detecting a potential difference between the virtual neutral point and the connection point of the single-phase rectifiers and generating a control signal for each phase. Therefore, the circuit structure can be simplified in the present invention. Furthermore, the present invention does not require a means for generating an artificial neutral point as disclosed in PCT International Publication No. WO99/57800. Such a means is actually a commercial frequency transformer, which operates at a low commercial frequency, and which is large, heavy, and expensive.

What is claimed is:

1. A polyphase rectifying apparatus used in a two or more-phase system, comprising:
    a single-phase rectifier assigned to each phase, and having first and second input terminals, wherein the first input terminal of each single-phase rectifier is connected to the corresponding phase and the second input terminals of each of the single-phase rectifiers are connected to each other; and
    a converter assigned to each phase, wherein the output from the single-phase rectifier of the relevant phase is input into the corresponding converter, wherein:
    the single-phase rectifiers for all the phases are controlled by a common control signal.

2. A polyphase rectifying apparatus as claimed in claim 1, wherein the second input terminal of each single-phase rectifier is connected to a neutral point.

3. A polyphase rectifying apparatus as claimed in claim 1, wherein each single-phase rectifier functions as a step-up chopper type active filter.

4. A polyphase rectifying apparatus as claimed in claim 1, wherein the converters of all the phases are controlled by a common control signal.

5. A polyphase rectifying apparatus as claimed in claim 2, wherein the converters of all the phases are controlled by a common control signal.

6. A polyphase rectifying apparatus as claimed in claim 3, wherein the converters of all the phases are controlled by a common control signal.

7. A polyphase rectifying apparatus as claimed in claim 1, wherein the common control signal is the output voltage from one of the single-phase rectifiers.

8. A polyphase rectifying apparatus as claimed in claim 1, wherein the common control signal is the maximum voltage among the output voltages from the single-phase rectifiers.

9. A polyphase rectifying apparatus as claimed in claim 1, wherein the common control signal is the minimum voltage among the output voltages from the single-phase rectifiers.

10. A polyphase rectifying apparatus as claimed in claim 1, wherein the common control signal is the average of the output voltages from the single-phase rectifiers.

11. A polyphase rectifying apparatus as claimed in claim 1, wherein the impedances of the single-phase rectifiers observed from the input are controlled by the common control signal.

12. A polyphase rectifying apparatus as claimed in claim 4, wherein the impedances of the converters observed from the input are controlled by the common control signal.

13. A polyphase rectifying apparatus as claimed in claim 5, wherein the impedances of the converters observed from the input are controlled by the common control signal.

14. A polyphase rectifying apparatus as claimed in claim 6, wherein the impedances of the converters observed from the input are controlled by the common control signal.

* * * * *